United States Patent [19]
Briggs

[11] 3,756,375
[45] Sept. 4, 1973

[54] MATERIAL HANDLING APPARATUS
[75] Inventor: Aubrey C. Briggs, Carnegie, Pa.
[73] Assignee: Dravo Corporation, Pittsburgh, Pa.
[22] Filed: Oct. 13, 1971
[21] Appl. No.: 188,863

[52] U.S. Cl. ............... 198/88, 198/89, 198/91, 214/14
[51] Int. Cl. .................................. B65g 63/00
[58] Field of Search ............... 214/14, 15 E, 142; 37/192 R; 212/48, 49; 198/75, 77, 89, 36, 88, 91, 94, 96, 93, 97, 140

[56] References Cited
UNITED STATES PATENTS

| | | | |
|---|---|---|---|
| 1,230,236 | 6/1917 | Stuart | 198/77 X |
| 3,349,892 | 10/1967 | Barre | 198/91 |
| 3,587,825 | 6/1971 | Smith | 214/10 X |
| 1,564,795 | 12/1925 | Le Vasseur | 198/94 X |
| 3,144,142 | 8/1964 | Wallace, Jr. | 214/15 E |
| 3,339,707 | 9/1967 | Ludwig | 198/77 |
| 3,387,721 | 6/1968 | Ludwig | 214/14 |
| 3,583,582 | 6/1971 | Ostarello | 214/14 |

Primary Examiner—Forlenza: Gerald M.
Assistant Examiner—Frank E. Werner
Attorney—Paul Bogdon

[57] ABSTRACT

Material handling apparatus having particular application to continuous unloading of bulk cargo from ships is disclosed. Basically, the apparatus includes a vertical mast with a laterally extending boom pivotally supported at one end to the mast. A power operated trolley is supported by the boom and is arranged, as with cooperating wheels and rails, to move longitudinally along the boom. A bucket elevator ladder frame is pivotally mounted at its upper end portion to the trolley. The ladder frame supports upper and lower sprockets, the upper sprocket preferably having larger diameters than the lower ones. An endless chain means forming a closed loop is supported by the sprockets. Spaced buckets are fixed to the chain means. A conveyor is carried by the boom and is arranged to receive material discharged from the buckets as they move around the upper sprockets, and to convey the material toward the mast. Hoist means supported by the mast are provided for lifting and lowering the boom. Counterweights are supported by the mast and are connected to the boom for counterbalancing the weight of the boom.

10 Claims, 9 Drawing Figures

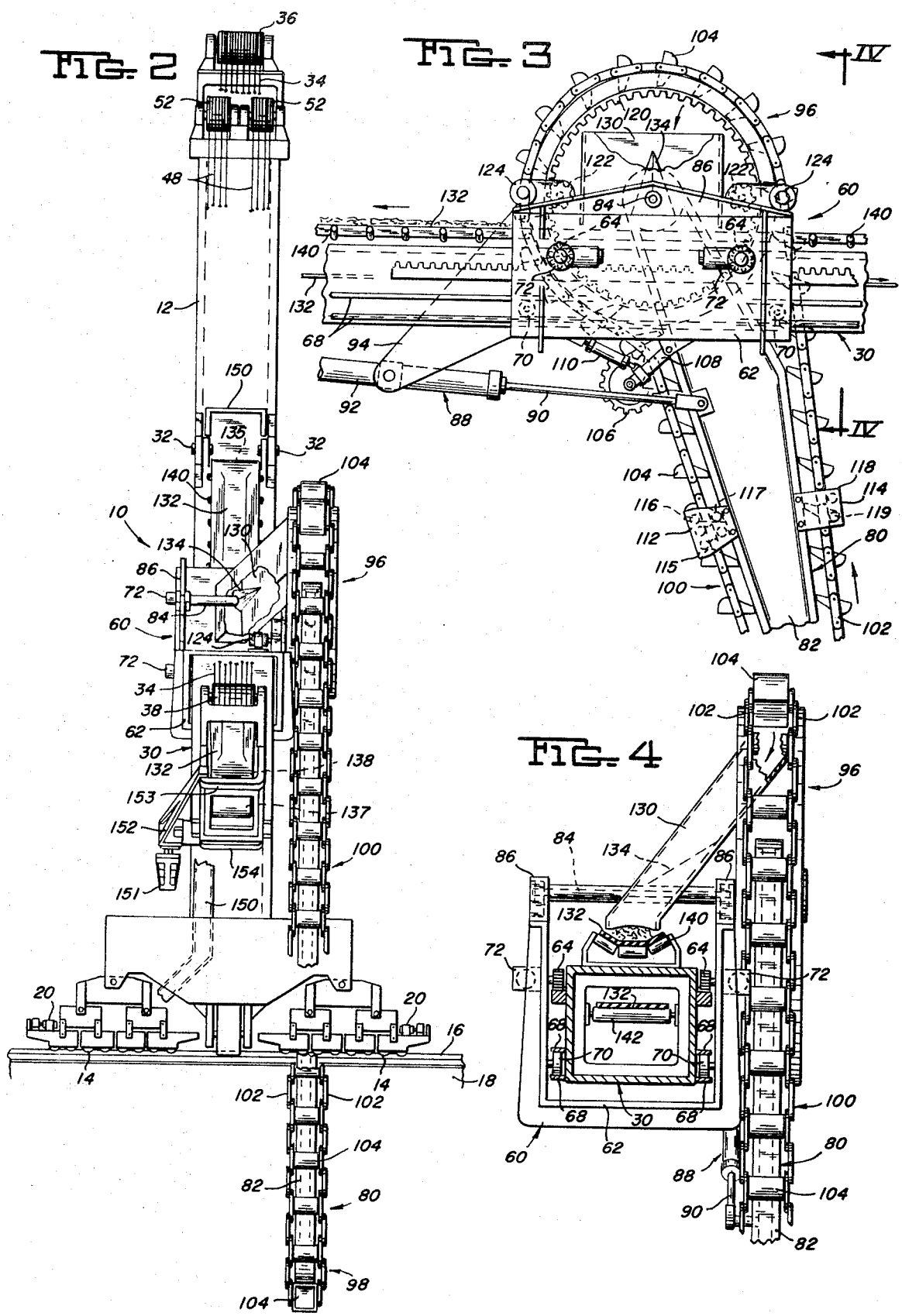

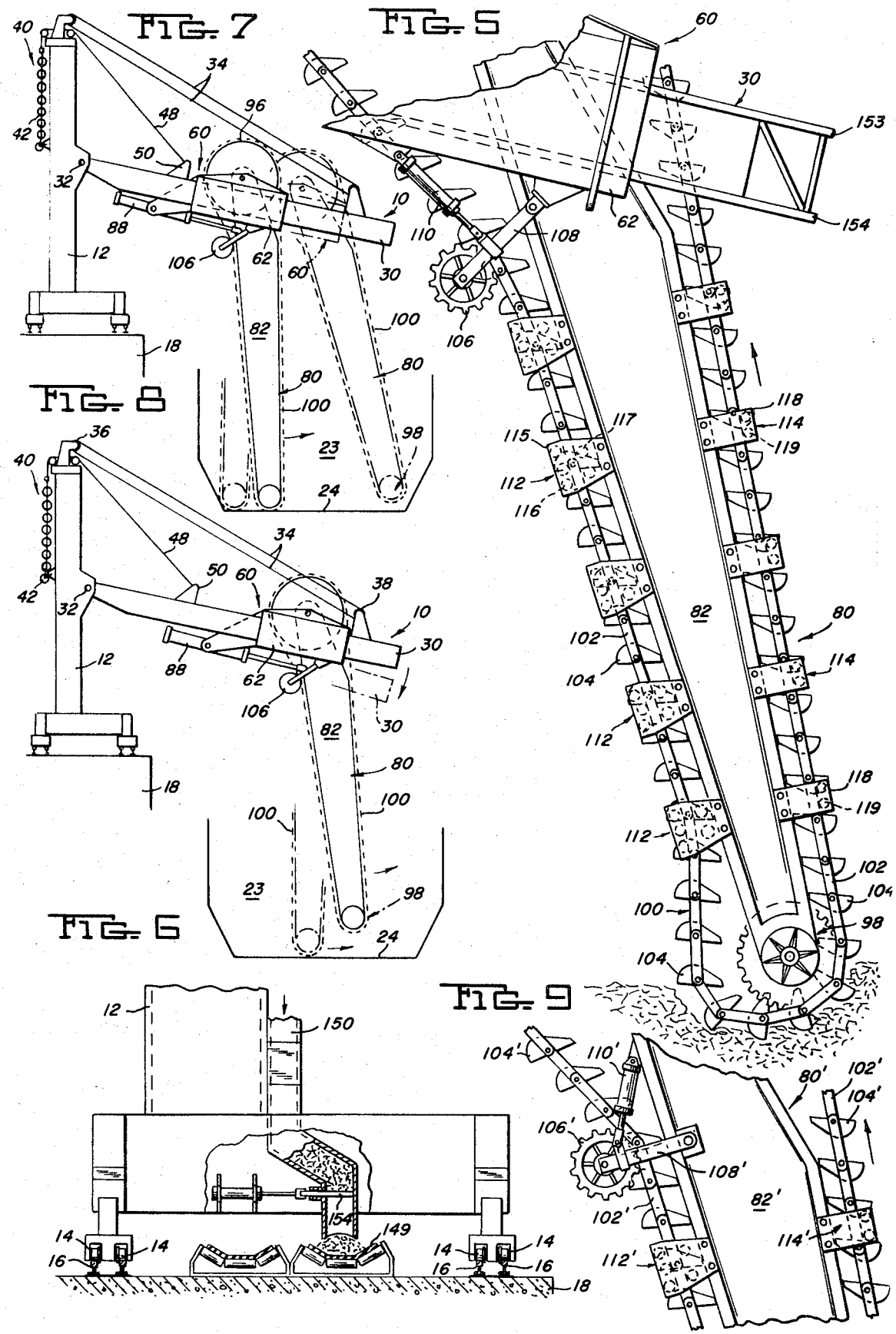

MATERIAL HANDLING APPARATUS

This invention relates to material handling apparatus and particularly to bulk material handling apparatus used for unloading material from the deep wide holds of bulk cargo ships.

Various apparatus are utilized for unloading bulk material from the holds of bulk cargo ships. Most bulk cargo unloading is done by clamshell unloaders which lower an open grab type bucket from an elevated horizontal boom into the ship hold. The bucket is closed to pick up material and is then lifted to clear the ship structure. The bucket is then carried by means of a travel trolley suspended from the boom, to a discharge hopper, and the bucket is then opened to discharge the material. An inherent disadvantage in using clamshell unloaders is that the material removal is non-continuous with a low unloading rate.

Continuous bulk material unloaders are in use and overcome this inherent disadvantage of clamshell unloaders. One such continuous unloader uses a bucket wheel or wheels mounted at the lower end of a vertical boom. The bucket wheel digs the material from the ship hold and then transfers the material to a vertically arranged bucket elevator which lifts the material to an elevated horizontal boom. The material is then transferred to a conveyor belt on the horizontal boom, which carries the material to a discharge hopper. Digging, lifting, transfer and discharge of material is accomplished continuously by the bucket wheel type unloader. However, this type unloader is undesirable because it is very complex in structure, resulting in a very expensive apparatus to construct. Another disadvantage of the bucket wheel type unloader is that the buckets of the vertical elevator will only be partially filled when the elevator support structure is positioned at an angle to the vertical. Thus, the unloading rate is decreased when it is necessary to tilt the bucket elevator at an angle to the vertical.

Another type of continuous unloader is the type that uses a parallelogram or T-head configuration type continuous chain bucket elevator for combining digging, lifting and transferring of the material. The bucket and chain assembly is mounted on a vertical boom which swings so that the buckets are crowded into the material. The bucket and chain assembly travels around the circumference of two lower sprockets and a large diameter upper sprocket. The two lower sprockets are positioned at the ends of a horizontal beam fixed to the lower end of a vertical mast. The bucket path is a modified parallelogram with the lower portion which extends into the ship hold being extremely wide. The material is lifted to a horizontal boom where it is transferred onto a conveyor which carries the material to a discharge hopper or the like. Although the known chain bucket unloaders provide continuous operation, they have undesirable features. Notable among those undesirable features are:

the difficulty of the apparatus to adapt for unloading all ship hold configurations because of the extremely wide digging end of the apparatus; excessive drive power requirements because of the large number of buckets traveling horizontally in the material before the material is lifted vertically; complete lack of support of the bucket chains between the drive and idler sprockets; and the inability to manuver the buckets for digging because the bucket chain support structure is fixed to the horizontal boom.

The present invention overcomes the above-noted defects and others in the bulk material unloading apparatus currently used, by providing a material handling apparatus which may be operated continuously, is simple in structure, and is readily maneuverable within overhanging ship holds. More particularly the overall structure of the material handling apparatus of the present invention preferably comprises: an upwardly extending support mast; a laterally extending boom for selectively pivoting the boom with respect to the mast; a trolley supported by the boom and arranged to move longitudinally along the boom; power means for driving the trolley along the boom; and elongated rigid bucket elevator ladder frame pivotally supported at its upper end to the trolley; upper and lower sprockets rotatably supported by the ladder frame; drive means for rotating one of the sprockets; endless chain means forming a closed loop around the sprockets and including spaced buckets carried by the chain means; conveyor means carried by the boom and arranged to receive material discharged from the buckets as they move around the upper sprockets and to convey the material toward the mast; hoist means supported by the mast for lifting and lowering the boom; and counterweight means supported by the mast and connected to the boom for counterbalancing the load on the boom.

With respect to clamshell type ship unloaders the present invention offers the greatest advantage of continuous digging, lifting, transferring, and discharging of the material. In addition, the present invention offers other advantages over the clamshell unloaders. A characteristic of the clamshell unloader is to rapidly lift and discharge large loaded single buckets. This characteristic causes shock loads in the clamshell unloader structure because of change from zero load in the bucket to fully loaded and then from fully loaded to unloaded, all occurring very suddenly. Suitable structure is required to withstand these reverse shock loads, with such structure being usually heavy resulting in excessive weight to the overall apparatus. Also, in order to lift the buckets rapidly from the ship hold, large oversize motors are required which is not the case with the present invention. Because the present invention provides continuous digging, lifting, and discharging of material, loading on the apparatus tends to be even and virtually shockless. Also the present invention allows high unloading rates with a single, reasonably light weight machine and one operator, whereas a plurality of clamshell machines would be required to provide an equivalent unloading rate.

As to the bucket wheel type and the parallelogram or T-head configuration type bucket chain continuous unloaders, the present invention offers the advantages of simplicity in construction and improved maneuverability. The movable trolley which carries the digging head allows the bucket chain to be moved transversely of the ship hold in a simple and efficient manner. In addition, the pivotal support of the bucket chain on the movable trolley, together with the pivotal support of the horizontal boom on the support mast, enables the apparatus of the present invention to be easily maneuvered within ship holds. Also, in the preferred form of this invention, the upper sprockets are at a larger diameter than the lower ones, with the digging head configuration being tapered downwardly, whereby a compact digging head is provided that will easily enter narrow ship hold openings. Such a compact digging head is provided without the complexity of a bucket wheel-bucket elevator combination. The narrow compact digging head of this invention, together with the pivoted arrangement of the digging head on a movable trolley, also enables the digging head to remove material directly from beneath the deck overhang formed over the ship hold. The narrow digging head further simplifies stowage of the head when clearing obstructions which might interfere with the unloader during docking or moving the ship along the dock.

The present invention also provides other subsidiary features which offer advantages over the well known clamshell and continuous loaders. One of these features is a variable counterweight system for counterbalancing the load on a laterally extending load carrying boom mounted on an upright support mast, which system preferably comprises: a plurality of weight members; link means pivotally connected to the weight members to form a chain of spaced weights; attachement means for securing the lowermost of the link means to the support mast at an intermediate position thereof; rope fall and sheave means supported by the mast for connecting the chain of weights to the boom; and the chain of weights being so constructed and arranged with respect to the mast and boom such that all of the chain of weights will act to counterbalance the load on the boom when the boom is in the horizontal position, and when the boom is raised, the lowermost of the weights and link means will be supported by the mast while the upper of the weights and link means will counterbalance the load on the boom. Thus, the variable counterwight system of the present invention will counterbalance the load on a pivoted boom at any angle of the boom with respect to the support mast. This desirable counterweight effect is provided with a simple structure as compared with other known counterweight structures seeking to achieve similar variable counterweight effects.

Another subsidiary feature of the present invention is a material receiving and storage apparatus for receiving material discharged from the conveyor on the horizontal boom. The apparatus preferably includes an elongated hopper supported by an upright mast and extending generally longitudinally thereof and arranged to receive material discharged from a conveyor upon which material transported upwardly by generally vertically extending chain buckets, or the like, is deposited. The hopper is sized to receive and store at least the entire quantity of material which would be on the conveyor from the point of discharge from the chain buckets to the hopper. The hopper could thus store all of the material originally on the conveyor and serves as a safety feature in the event of an unexpected shutdown of the dock side conveyor system onto which the hopper would discharge.

Yet another feature of the present invention is an arrangement of elements for selectively loosening the chain means to provide a somewhat horizontally flattened bucket path at the lower end of the digging head whereby improved cleanup of the bottom of the ship hold results. More particularly fixed roller supports are arranged on the vertical ladder frame to engage the chain means and provide additional support therefor. Also, an idler wheel means is arranged at the upper region of the ladder frame with the idler wheel means being selectively shiftable for tightening and loosening the chain means. The roller guide members are disposed on the lower rear end portion of the ladder frame in such a manner that when the idler wheel is shifted for slackening the chain means, the path of travel of the chain means in the vicinity of the lower sprockets will be directed first away from the ladder frame and then toward it, whereby the buckets would be dragged a short distance over the load being handled prior to beginning their upward travel around the lower sprockets. Thus, apparatus is provided which is simply constructed and capable of efficiently cleaning up the bottom of a ship hold.

Other details and advantages of this invention will become apparent as the following description of a present preferred embodiment thereof proceeds.

In the accompanying drawings there is shown a present preferred embodiment of this invention in which:

FIG. 2 is an end elevation view of the ship unloading apparatus of FIG. 1 with certain parts being broken away to show details of construction;

FIG. 3 is an enlarged fragmentary view of the upper section of the digging head and the outer or free end of the horizontal pivotal boom of the ship unloading apparatus of FIG. 1;

FIG. 4 is a view looking along the line IV—IV of FIG. 3;

FIG. 5 is an enlarged fragmentary view of the upper and lower sections of the digging head showing how the chain sags when the idler wheel is selectively positioned to loosen the chain;

FIG. 6 is an enlarged fragmentary view of the lower section of the surge hopper;

FIGS. 7 and 8 are diagrammatic representations of the ship unloading apparatus of the present invention illustrating the various methods of operating the same to achieve level horizontal digging of material from a ship hold; and FIG. 9 is an enlarged fragmentary view of an upper section 7 of the digging head showing another arrangement of the idler wheel assembly.

Figure 1:
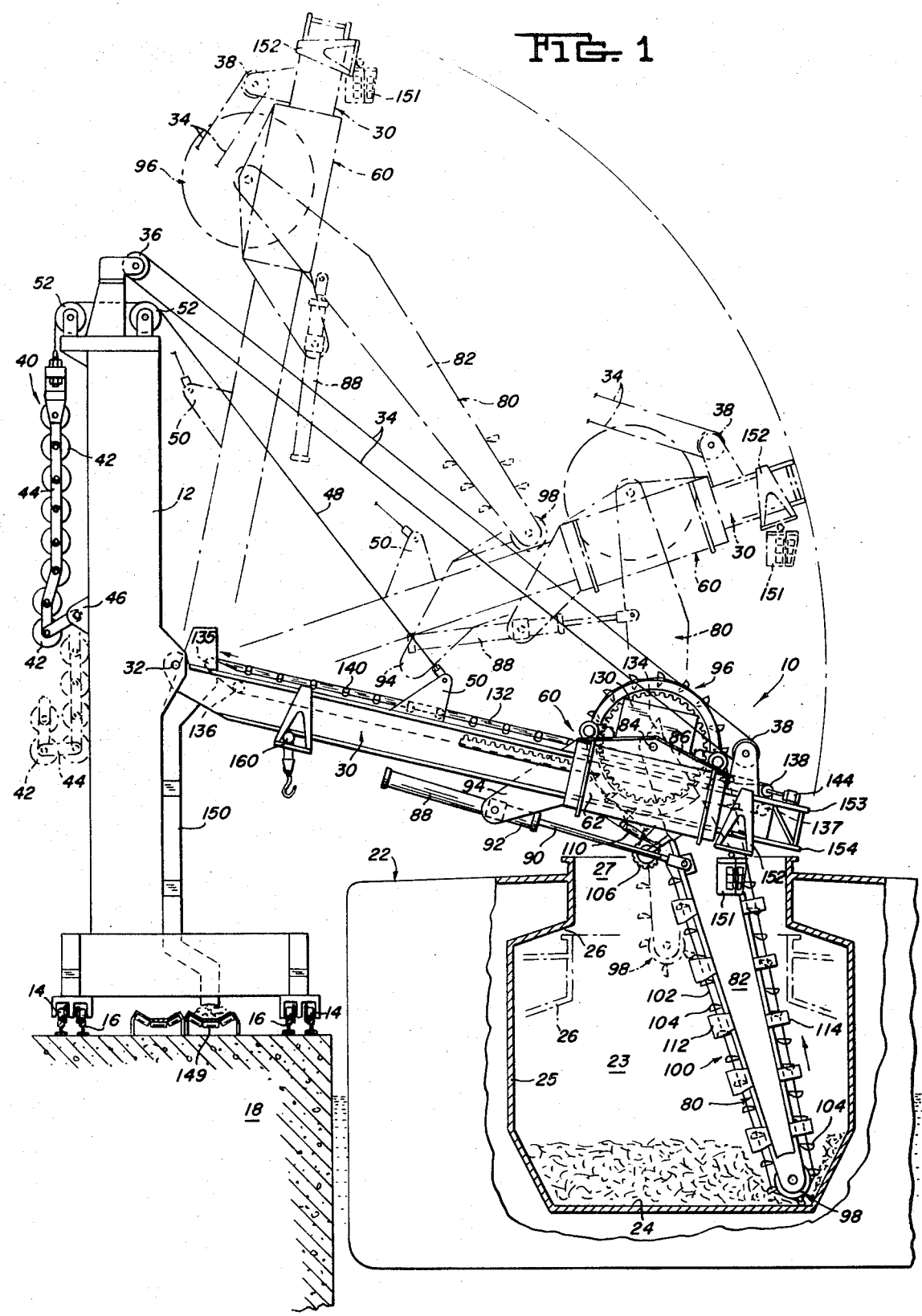
FIG. 1 is a side elevation view of a bulk material ship unloading apparatus embodying the present invention and showing, in solid line, the digging head in a ship hold and showing in phantom outline, the digging head and pivotal boom in other positions relative to the vertical support mast.

Referring now to the various views of the drawings wherein like reference numerals relate to like parts throughout, 10 generally relates to a continuous bulk material ship unloading apparatus embodying the present invention. Ship unloading apparatus 10 includes a generally vertical support mast 12 having a series of wheel assemblies 14 fixed to the lower end thereof and sized to operatively engage rails 16 extending along dock 18. Electric motors 20 suitably connected with a source of electricity, not shown, are coupled with wheel assemblies 14 for propelling the entire ship unloading apparatus 10 along the dock 18 to position the unloading apparatus alongside a bulk cargo ship 22 which is moored alongside dock 18 for being unloaded. Ship 22 has a hold 23 defined by the hold bottom 24 and sidewalls 25. The sidewalls 25 extend inwardly at their top portions to form overhangs 26 and a hatch opening 27 which is narrower than the corss-section of ship hold 23.

An elongated boom 30 extends laterally from mast 12 and is supported by pivot support 32 arranged at an intermediate position of the mast. The boom 30 is movable over an arcuate distance about pivot support 32, as shown in FIG. 1 by the phantom outlines of the boom. Luffing rope falls 34 reeved around sheaves 36 and 38 supported on the top of mast 12 and the free end of boom 30, respectively, are suitably driven for hoisting and lowering boom 30 with respect to mast 12. The boom 30 is also suspended by counterweight assembly 40 including a plurality of preferably cylindrically shaped weight members 42 coupled together by pivotal links 44, with the lowermost link being pivotally secured to a mounting pad 46 fixed at an intermediate position of mast 12. The counterweight assembly 40 is secured to boom 30 by counterweight rope falls 48 attached at one end to the uppermost links 44 and at the other end to support ears 50 fixed to an intermediate location of boom 30. The counterweight rope falls 48 are reeved over drums 52 secured to the top of mast 12. The counterweight assembly 40 is sized for counterbalancing the load on boom 30 and acts to counterbalance the load at the different angular positions of boom 30 with respect to mast 12. More explanation of the counterbalancing effect of counterweight assembly 40 will be given later on in this description.

A trolley assembly 60 is arranged on boom 30 for longitudinal movement with respect thereto. As clearly shown in FIGS. 3 and 4, trolley assembly 60 includes hollow housing 62 sized to fit over boom 30, which housing supports gears 64 sized and shaped to operatively engage elongated rack members fixed to the upper outer sides of boom 30. Elongated tracks 68 are fixed to the lower outer sides of boom 30 and are sized to be operatively engaged by rollers 70 mounted to the inner wall of trolley housing 62. Suitable drive means, such as hydraulic motors 72 connected to a source of hydraulic fluid, not shown, are coupled with gears 64 for driving trolley assembly 60 along boom 30.

A digging head assembly 80 is supported by trolley assembly 60 and is mounted to trolley housing 62 for pivotal movement with respect thereto. Digging head assembly 80 includes an elongated rigid downwardly tapering bucket elevator ladder frame 82 mounted at its upper end portion to a pivot shaft 84 disposed above the top surface of boom 30 and extending between upwardly extending ears 86 fixed to trolley housing 62. Ladder frame 82 may be selectively pivoted with respect to trolley housing 62 by means of hydraulic cylinder assembly 88 having the rod 90 thereof coupled to an intermediate position of ladder frame 82 and the cylinder 92 thereof pivotally mounted to rearwardly extending ears 94 fixed to trolley housing 62. Hydraulic cylinder assembly 88 is a double acting cylinder and is suitably connected with a source of pressurized hydraulic fluid, not shown. Ladder frame 82 also rotatably supports an upper sprocket wheel assembly 96 and a lower sprocket wheel assembly 98. Upper sprocket wheel assembly 96 is of a larger diameter than lower sprocket wheel assembly 98, with both assemblies being sized and shaped to operatively engage an endless chain assembly 100, including parallel chains 102 formed of pivotally connected links and spaced, scoop-shaped buckets 104 rigidly fixed to the links of the chains 102. As shown in FIG. 1 and 3, idler wheels 106, one of which is shown, are supported by ladder frame 82 at the upper portion thereof, which idler wheels are arranged to guide the chains 102 from upper sprocket wheel assembly 96 in the manner shown, whereby a downwardly tapering profile between the upper and lower sprocket wheel assemblies is given to the chain assembly 100. Idler wheels 106 are supported by links 108 pivotally mounted at one end to trolley housing 62 and rotatably supporting the idler wheels at the other ends thereof. A double acting hydraulic cylinder 110 is operatively connected to the links 108 for pivoting the links with respect to ladder frame 82, whereby the idler wheels may be selectively moved towards and away from the ladder frame, and chain assembly 100 tightened and slackened, respectively as it moves about the ladder frame. Thus, the chain assembly 100 may be loosened so that the buckets 104 can follow a somewhat flat path near the lower sprocket wheel assembly 98 and thereby more effectively clean the bottom of the ship hold 23. The slackening of the chain assembly 100 for bottom cleaning of the ship hold 23 will be more fully explained hereinafter. In FIG. 9, there is shown another arrangement of the idler wheel assembly whereby the idler wheels 106' are supported by links 108' pivotably mounted to ladder frame 82'. Tightening and slackening of chain 102' will result through appropriate operation of cylinder 110'.

Additional support is provided for chain assembly 100 by guide brackets 112 and 114 fixed to ladder frame 82 on the rear and front sides thereof, respectively. Guide brackets 112 comprise a housing 115 supporting front and rear rollers 116 and 117, respectively arranged to engage the front and rear faces of the links forming chain 102 as they pass the rear side of ladder frame 82. The front guide brackets 114 comprise a housing 118 and front rollers 119 arranged to engage the front faces of the links of chain 102 as they pass the front side of ladder frame 82. As shown in FIGS. 1 and 5, both the rear and front guide brackets 112 and 114 are spaced at close intervals along the ladder frame 82, so as to prevent unintentional sagging of the chain 102 caused by the weight of the chain and by the weight of the buckets 104 acting on the chain. Also, the rear brackets 112 are spaced at the lower end portion of the ladder frame 82 in such a manner as to permit a sagging pattern of the chain 102 whereby the bottom of the ship hold 23 will be effectively cleaned by the buckets 104. In other words, the spacing of the lower rear guide brackets 112 is such that when hydraulic cylinder 110 is actuated to pivot the links 108 and move idler wheel 106 for loosening chains 102, the chains 102 will take the path shown in FIGS. 1 and 5, that is, the chains 102 will move first away from the ladder frame 82 and then toward it. Thus, when chains 102 are slackened, the buckets 104 would be dragged a short distance over the material in ship hold 23 before they begin their upward travel around the lower sprocket wheel assembly 98.

The upper sprocket wheel assembly 86 serves as the drive wheels for the chain assembly 80. As shown in FIG. 3, upper sprocket wheel assembly 96 includes an internal planet gear 120 sized to mesh with diametrically opposed sun gears 122 which are coupled to the drive shafts of motors 124. Motors 124 are suitably connected to a source of electrical power, not shown, and are supported on the upper surface of trolley housing 62.

Each bucket 104 has a generally scooped shape with the rear portions, that is, those portions facing the mast 12 as the buckets are positioned at the left or rearward side of the ladder frame 82 as viewed in FIG. 3, being deeper in depth than the forward portion thereof. Each bucket 104 tapers from the rear portion thereof to a sharp forward edge. The buckets 104 are arranged with respect to the chains 102 such that the open top of the buckets are generally normal or at a slight angle to the chains. The buckets 104 are also arranged with respect to chains 102 so that the open tops are facing the material being handled when the buckets are passing the rear face of ladder frame 82. Thus, as the buckets 104 begin to turn around lower sprocket wheel assembly 98, the rear portions of the buckets will dig into the material and scoop it into the interior thereof as they complete their travel around the lower sprocket assembly. The open tops of the filled buckets 104 will then be facing upwardly as the buckets pass the front face of ladder frame 82. As the buckets 104 travel over the upper sprocket wheel assembly 96, the material therein will be dumped out of the forward end thereof. The dumped material will be received by an inclined discharge chute 130 supported by the top surface of trolley housing 62 and extending from adjacent the planetary gear 120 of upper sprocket wheel assembly 96 to beneath the upper surface of trolley housing 62 and to a discharge opening adjacent work traverse of an elongated belt conveyor 132 supported on roller idler wheels on the upper surface of boom 30. A generally pyramidal shaped upwardly extending divider member 134 extends over a major portion of the center section of discharge chute 130 for separating the flow of material to provide generally unifrom distribution of material on conveyor 132.

Conveyor 132 extends over a major portion of the length of boom 30 and, as shown in FIG. 1, is supported by idler wheels 135, 136, 137 and drive wheel 138, as well as by idler rollers 140 and 142, shown in FIG. 4, and spaced along the work and return traverses thereof, respectively. Drive wheel 138 is suitably coupled to drive motor 144 mounted on the upper surface of boom 30 and connected to a source of electrical power, not shown. The discharge end of conveyor 132 is disposed within the confines of an elongated surge hopper 150, supported and extending longitudinally of the front surface of mast 12. The lower or discharge end of surge hopper 150 is arranged adjacent the work traverse of belt conveyor 149 supported by idler rollers mounted on the upper surface of dock 18. As clearly shown in FIG. 6, a sliding door 154 is arranged at the discharge end of the surge hopper 150 for selectively opening or closing the discharge opening of the hopper. The surge hopper 150 is sized to receive and store at least the entire quantity of material on conveyor 132 from the point of discharge on conveyor 132 from the buckets 104 as they pass discharge chute 130 to the hopper 150. By so sizing the discharge hopper 150, all the material on conveyor 132 may be stored by the hopper if the dock conveyor 149 unexpectedly shuts down. This will allow time for the digging head 80 to be shut down without spilling material all over the dock.

The free end portion of boom 30 is provided with structure for supporting an operator's cab 151. The cab 151 is arranged on a frame 152 which mates with rail member 153 and 154 on boom 30. The frame 152 and rail members 153 and 154 are constructed so that the cab 151 may be moved around the free end and along one side of the boom 30. Power means, not shown, are also provided for moving the cab 151 with respect to the boom 30. The boom 30 is also shaped to receive a general utility powered winch 160 arranged to move bodily longitudinally of the boom.

In operation of the unloading apparatus 10, the bulk cargo ship 22 to be unloaded is docked within the proximity of the unloading apparatus so that all of the holds of the ship are within the range of the rails 16 upon which the unloading apparatus travels. The unloading apparatus 10 is then driven along the rails 16 to position the digging head 80 for unloading a particular ship hold 23. Boom 30 is then lowered by rope falls 34, while the operator concurrently positions trolley 60 and swings digging head 80 to a desired unloading position. The chain assembly 100 and conveyor 132 are started with the buckets 104 digging the material and transporting upwardly for discharge onto chute 130 and then onto conveyor 132 and finally into surge hopper 150. The digging is continued following the overall digging pattern specified for the particular material being unloaded. When the material is unloaded to near the bottom of the ship hold 23, the chain 102 may then be unslackened by actuating cylinder 100 to move idler wheel 106 to thereby flatten the pattern of the chain at the lower portion of the ladder frame 82. The buckets 104 will then be dragged generally horizontally across the bottom of the ship hold 23 to clean the material off of the bottom. Because of the slack in the chain 102 the leading edge or lips of buckets 104 will move to conform to any irregularities in the ship's bottom to thereby aid in cleaning the bottom.

The unloading apparatus 10 described above is capable of providing horizontal level digging of material in ship hold 23 without need for using the hoist for lifting or lowering boom 30. As shown schmatically in FIG. 7, the boom 30 is positioned with a fixed slope with respect to mast 12, with the trolley 60 digging head 80 being moved to maintain the lower end of digging head in a generally horizontal plane. There are various advantages of not using the hoist for the boom 30 to provide compensation for level horizontal digging. By using the hydraulic cylinder 88 and hydraulic motors 72 to position the rigid digging head 80 and trolley 60, respectively results in a more stable operation than by using the hoist to move the flexible rope falls 34 to position the boom 30. Also, using the hydraulic system for compensating for level digging eliminates the constant starting and stopping of the electric motors of the hoist for boom 30, and thereby lengthens the useful life of those motors. In addition, the movements of the trolley 60 and digging head 80 are smoother than that of the boom 30, thereby avoiding discomfort and distraction to the operator when he is controlling the digging operations.

FIG. 8 schematically illustrates another method of operating unloading apparatus 10 to achieve level horizontal digging. FIG. 8 shows the level digging being achieved by varying the slopes of the boom 30 and digging head 80, while keeping the trolley 60 fixed in position. The operations of FIGS. 7 and 8 may also be combined so that the slopes of boom 30 and digging head 80 are varied while the trolley 60 is moved along the boom. The combined operation would provide the maximum sweep of the digging head 60 and would allow the maximum possible area to be covered during clean-up of the bottom of ship hold 23. Thus, the variety of methods of operating the unloading apparatus 10 results in a machine having wide flexibility in its methods of use.

As indicated earlier, the counterweight assembly 40 is constructed such that the weights suspended on counterweight rope falls 48 counterbalance the load on boom 30. Thus, the counterweight assembly 40 provides variable counterbalancing for boom 30 as the boom is pivoted upwardly with respect to mast 12. As FIG. 1 illustrates in phantom outline, when boom 30 is lifted, the lowermost weights 42 and links 44 drop down and are supported by mast 12, since they are hanging on mounting pad 46. Thus, the upper weights 42 and links 44 are suspended by counterweight rope falls 48 to counterbalance the load on boom 30. The weights 42 and links 44 are sized to provide variable counterbalancing following a Cosine curve. In other words, with the boom 30 in the generally horizontal position with its angle being considered as 0 degrees, the maximum weight of the counterweight assembly 40 acts to counterbalance the load on boom 30. As the boom 30 is lifted upwardly, with its angle to the horizontal increasing, the weight needed to counterbalance the load on boom 30 decreases. The weight of each individual counterweight 44 may be varied in order that the counterbalancing effect of counterweight assembly 40 on boom 30 would follow a Cosine curve.

It should be readily apparent how the unloading apparatus 10 provides the advantages over the heretofore used unloading machines as mentioned in the above description. It should also be apparent that various arrangements of the elements described are possible within the scope of this invention. For example, the boom 30 may be fixed with trolley 60 and digging head 80 being movable as described; and digging head 80 may be fixed with boom 30 and trolley 60 being movable. Also, the variable counterweight assembly 40 may be used with any arrangement of a pivoted boom. In addition, the narrowing digging head 80 and chain sagging features as described may be applied to any type of appropriate material handling apparatus. Yet other variations of this invention should be readily recognized by those skilled in this art.

While I have shown and described a present preferred embodiment of this invention, it is to be distinctly understood that the invention is not limited thereto but may be otherwise variously embodied within the scope of the following claims.

I claim:

1. A material handling apparatus comprising:
an upwardly extending support mast;
a laterally extending boom pivotally supported at one end to said mast;
a trolley supported by said boom and arranged to move longitudinally along the boom;
power means for driving said trolley along said boom;
an elongated rigid bucket elevator ladder frame pivotally supported at its upper end to said trolley;
means operative with said ladder frame for pivoting same with respect to said trolley;
upper and lower sprockets rotatably supported by said ladder frame;
drive means for rotating one of said sprockets;
endless chain means forming a closed loop around said sprockets and including spaced buckets carried by said chain means;
conveyor means carried by said boom and arranged receive material discharged from said buckets as they move around said upper sprockets and to convey the material toward said mast;
hoist means supported by said mast for lifting and lowering said boom; and
counterweight means supported by said mast and connected to said boom for counterbalancing the load on said boom.

2. The material handling apparatus as set forth in claim 1 wherein said upper sprocket has a larger diameter than said lower sprocket; and including idler wheel means supported at the upper region of said ladder frame for guiding said chain means such that the path profile of the chain means is one of general narrowing between the upper and lower sprockets.

3. The material handling apparatus as set forth in claim 2 including fixed roller support members arranged on said ladder frame and engaging said chain means for providing additional guide support therefor; and whereby said idler wheel means is supported for selective shifting with respect to said ladder frame such that said chain means may be selectively tightened and loosened with respect to said lower sprocket.

4. The material handling apparatus as set forth in claim 3 wherein said roller supports members disposed on the lower rear end portion of said ladder frame are arranged in such a position that when said idler wheel means is shifted for slackening said chain means, the path of travel of the chain means in the vicinity of said lower sprockets will be directed first away from said ladder frame and then toward it whereby said buckets would be dragged generally horizontally a short distance over the load being handled prior to beginning their upward travel around said lower sprockets and the leading edges of said buckets will move along the contour of the surface they encounter.

5. The material handling apparatus as set forth in claim 1 wherein said counterweight means includes a plurality of separate weight members pivotally coupled by links, the lowermost link being pivotally connected to said support mast at an intermediate position thereof; said counterweight means further including rope fall means and sheave means for connecting said weight members to said boom; said counterweight means being so arranged with respect to said support mast and said boom such that all of said weight members will act to counterbalance the load on said boom when said boom is in the generally horizontal position, and when said boom is raised the lowermost of said weight members will be supported by said mast while the upper of said weight members will counterbalance the load on said boom.

6. The material handling apparatus as set forth in claim 5 wherein said counterweight means is so constructed and arranged with respect to said support mast and said boom that the number of said weight members counterbalancing the load on said boom depends directly on the angle between said boom and said support mast so that as the angle decreases the number of weight members needed for counterbalancing decreases.

7. The material handling apparatus as set forth in claim 1 including an elongated hopper supported by said support mast and arranged for receiving material transported by said conveyor means and for storing material prior to discharging the material therefrom.

8. The material handling apparatus as set forth in claim 7 wherein said hopper is sized to receive and store at least the entire quantity of material which would be on said conveyor means from the point of discharge of said buckets to said hopper.

9. The material handling apparatus as set forth in claim 1 including a discharge chute arranged between said conveyor means and the position of discharge of said buckets as they move around said upper sprockets; and further including a material flow divider fixed on said discharge chute for dividing the flow of material moving down the chute such that material is evenly distributed on said conveyor means.

10. The material handling apparatus as set forth in claim 1 wherein said buckets have a generally scoop shape with a rear portion deeper in depth than the forward portion thereof and tapering upwardly towards a generally sharp forward edge; said buckets being supported by said chain means such that the open top of the buckets are in planes generally normal to the chain means and the deep depth rear portions face rearwardly of said ladder frame when the buckets are disposed on the rearward side of the ladder frame and the rear portions of the buckets face forwardly when they are travelling upwardly on the forward side of said ladder frame, whereby material will be scooped up when the buckets are advanced around said lower sprockets and will discharge material from the forward ends thereof as the buckets are advanced around said upper sprockets.

* * * * *